(12) United States Patent
Song et al.

(10) Patent No.: US 8,187,701 B2
(45) Date of Patent: May 29, 2012

(54) POROUS HUMIDITY-CONTROL TILE AND METHOD FOR MANUFACTURING THE SAME

(75) Inventors: In Hyuck Song, Changwon-si (KR); Hai Doo Kim, Changwon-si (KR); Young Wook Kim, Seoul (KR)

(73) Assignee: Korea Institute of Machinery & Materials, Taejon (KR)

( * ) Notice: Subject to any disclaimer, the term of this patent is extended or adjusted under 35 U.S.C. 154(b) by 496 days.

(21) Appl. No.: 12/422,047

(22) Filed: Apr. 10, 2009

(65) Prior Publication Data

US 2009/0280313 A1    Nov. 12, 2009

(30) Foreign Application Priority Data

May 8, 2008  (KR) ........................ 10-2008-0042674

(51) Int. Cl.
   *B32B 3/26*   (2006.01)
   *B29C 67/20*  (2006.01)
(52) U.S. Cl. .................. 428/221; 428/312.8; 428/313.5; 428/314.2; 428/315.5; 428/315.7; 264/49
(58) Field of Classification Search .................. None
   See application file for complete search history.

(56) References Cited

U.S. PATENT DOCUMENTS

2005/0012233 A1*  1/2005  Kim et al. ........................ 264/43

FOREIGN PATENT DOCUMENTS

JP  2001-130980 A  5/2001
KR  10-2005-0009322 A  1/2006

* cited by examiner

*Primary Examiner* — Ling Xu
(74) *Attorney, Agent, or Firm* — Saliwanchik, Lloyd & Eisenschenk

(57) ABSTRACT

Provided is a porous humidity-control tile including about 40% to about 95% by weight of diatomite, and one or more of ochre, red clay, kaolin, zeolite, illite, vermiculite, feldspar, pottery stone, and pyrophyllite. The porous humidity-control tile has about 10 vol % to 80 vol % of cellular spherical pores having a size corresponding to a size of hollow pore forming material that is removable by heat treatment. The porous humidity-control tile has a rate of moisture adsorption/desorption per unit weight in a range from about 20 g/kg to about 60 g/kg and a rate of moisture adsorption/adsorption per unit area in a range from about 150 g/m2 to about 450 g/m2. Therefore, the porous humidity-control tile can be light, and the amount of adsorption/desorption per unit weight of the porous humidity-control tile can be improved.

12 Claims, 5 Drawing Sheets

POROUS HUMIDITY-CONTROL TILE AND METHOD FOR MANUFACTURING THE SAME

CROSS-REFERENCE TO RELATED APPLICATION

The present application claims the benefit under 35 U.S.C. §119 of Korean Patent Application No. 10-2008-0042674, filed May 8, 2008, which is hereby incorporated by reference in its entirety.

BACKGROUND

The present disclosure relates to a porous humidity-control tile and a method for manufacturing the porous humidity-control tile, and more particularly, to a porous humidity-control tile having cellular micro-spherical pores uniformly formed in a moisture controllable natural material having nano pores for improving moisture adsorption/desorption ability, and a method of manufacturing the porous humidity-control tile.

Recent buildings are air-tightly insulated for improving heating or cooling efficiency and saving energy; however, this air-tight insulation may cause environmental health problems and make it difficult to control humidity.

About 40% to 70% humidity is proper for human residences. If humidity is higher than the range, mites or mold may increase, and thus allergic diseases such as asthma and atopy may increase due to excrements or harmful fine particles of such living things. On the other hand, humidity lower than the above-mentioned range may cause other problems: for example, virus diseases such as a cold, malfunctioning of precise devices caused by static electricity, fires, and deterioration of works of art.

Therefore, development of humidity-control antibacterial materials is necessary and socially important for preventing contamination of residual environments caused by mold or pathogenic bacteria and keeping residual environments clean.

Generally, humidity-control materials have capillaries on their surfaces so that the humidity-control materials can condense vapor (gas) if humidity is high and evaporate condensed water if humidity is low. Such a humidity-control material is used to maintain the inside humidity of a building or a closed space within a predetermined range according to the external environmental conditions. For this, the humidity-control material has about 3-nm to 7-nm fine pores.

Although artificial materials having chemically formed nano pores are used as building humidity-control materials, such artificial materials are expensive. Therefore, due to economical reasons, natural materials are mainly used as humidity-control materials. Therefore are patents related to natural humidity-control materials.

Korean Patent No. 0495571 (Jun. 6, 2005) discloses "Humidity controlling healthy tile composition and process for the preparation of tile."

In detail, the 0495571 Patent relates to a health tile including loess, clay, fly ash, diatomite, and crushed glass, and a process for preparing the health tile. The disclosed health tile includes 0 wt % to 30 wt % of natural loess, 30 wt % to 50 wt % of natural clay, 30 wt % to 50 wt % of fly ash, 10 wt % to 30 wt % of diatomite, and 5 wt % to 15 wt % of crushed glass. Moisture adsorption, desorption, and deodorization characteristics of the health tile are explained.

Korean Patent No. 0651080 discloses a humidity-control non-organic composition including: 100 parts by weight of one of silica gel, zeolite, and calcium silicate; 10 to 45 parts by weight of resin binder, 70 to 200 parts by weight of limestone and calcium silicate; and 100 to 200 parts by weight of water.

Japanese Unexamined Patent Application Publication No. H08-144387 discloses a humidity-control building material prepared by hardening a mixture of calcium hydroxide and a composition including allophone or imogolite, and a method for preparing the humidity building material. Besides the above-mentioned patents, there are many patents relating to a humidity-control building tile using zeolite and calcium silicate.

However, humidity-control tiles of the related art are heavy because the humidity-control tiles are formed of a dense material and are large due to current trend of building materials. Therefore, it is necessary to reduce the weight of the humidity-control tiles for convenience in transportation and working.

The weight of such a humidity-control tile can be reduced by forming pores in the humidity-control tile; however, this may reduce the strength of the humidity-control tile. Generally, the weight of a humidity-control tile is reduced by fabricating the humidity-control tile using a pore forming material.

If a chemical foaming agent is used as a pore forming material for fabricating a humidity-control tile, relatively large pores are formed in the humidity-control, and the mechanical characteristics of the humidity-control tile are deteriorated. In an alternative method, polymer sponge is used as a pore forming material for fabricating a porous material.

A brief explanation will now be given on the alternative method. Polymer sponge is placed in ceramic slurry to coat the polymer sponge with the ceramic slurry, and the polymer sponge is compressed to remove excessive ceramic slurry. Then, the polymer sponge is dried and fired to form porous ceramic.

During the firing process, the polymer sponge is removed by thermal decomposition and gasification, and thus pores are formed at places where the polymer sponge is removed.

However, the size of pores formed in the ceramic fabricated using a polymer sponge are relative large at about 200 μm or greater, and since struts located between the pores of the ceramic are also porous, the durability and strength of the ceramic are low.

BRIEF SUMMARY

Embodiments of the subject invention provide a porous humidity-control tile including about 40% to about 95% by weight of diatomite, and one or more of ochre, red clay, kaolin, zeolite, illite, vermiculite, feldspar, pottery stone, and pyrophyllite. The porous humidity-control tile has about 10 vol % to 80 vol % of cellular spherical pores having a size corresponding to a size of hollow pore forming material that is removable by heat treatment. The porous humidity-control tile has a rate of moisture adsorption/desorption per unit weight in a range from about 20 g/kg to about 60 g/kg and a rate of moisture adsorption/desorption per unit area in a range from about 150 g/m$^2$ to about 450 g/m$^2$.

Embodiments of the subject invention also provide a method for manufacturing a porous humidity-control tile, the method including: mixing and pulverizing raw-material powder; supplying moisture to the pulverized powder to form a slurry; mixing the slurry with hollow microspheres used as a pore forming material; de-airing the slurry mixed with the pore forming material; shaping the de-aired slurry to obtain a half-finished product; drying the half-finished product; and firing the dried half-finished product in a kiln.

The details of one or more embodiments are set forth in the accompanying drawings and the description below. Other features will be apparent from the description and drawings, and from the claims.

DETAILED DESCRIPTION

Reference will now be made in detail to the embodiments of the present disclosure, examples of which are illustrated in the accompanying drawings. The present disclosure may, however, be embodied in many different forms and should not be construed as being limited to the embodiments set forth herein.

Figure 1:
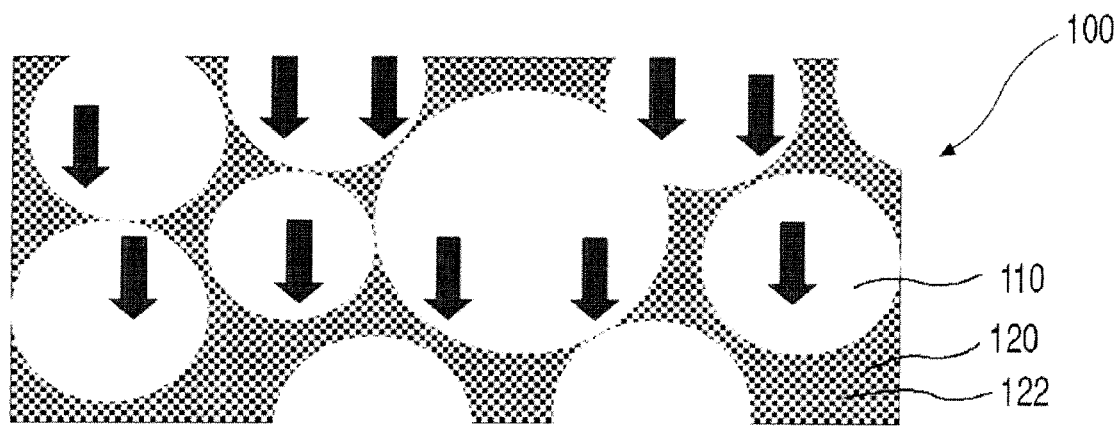
FIG. 1 is a schematic view showing the internal structure of a porous humidity-control tile according to an embodiment.
Figure 2:
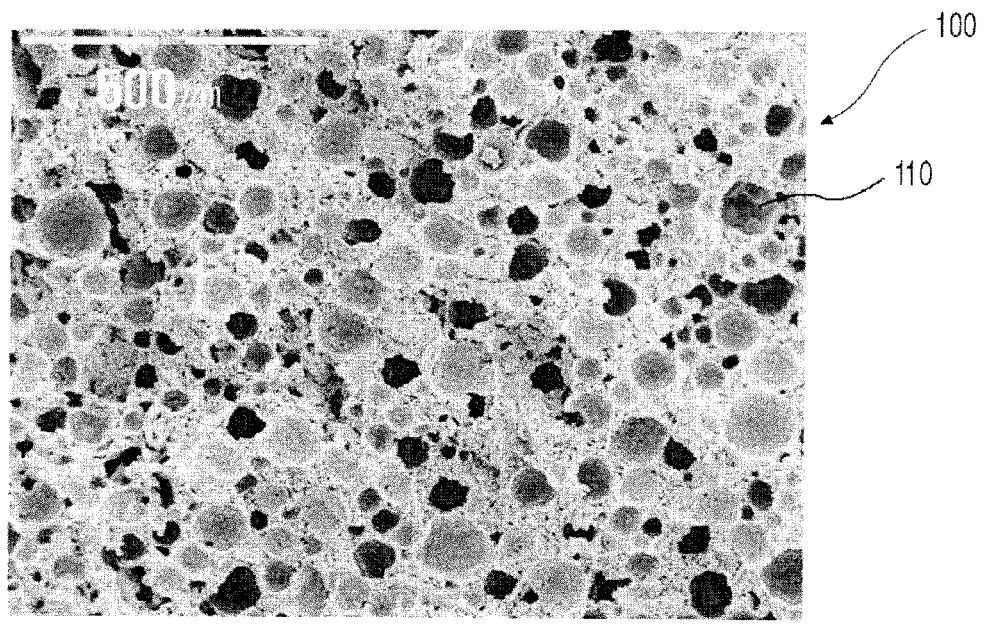
FIG. 2 is a low-magnification image showing a section of the porous humidity-control tile.

FIG. 1 is a schematic view showing the internal structure of a porous humidity-control tile 100 according to an embodiment. FIG. 2 is a low-magnification image showing a section of the porous humidity-control tile 100, and FIG. 3 is a high-magnification image showing a section of the porous humidity-control tile 100.

Figure 3:
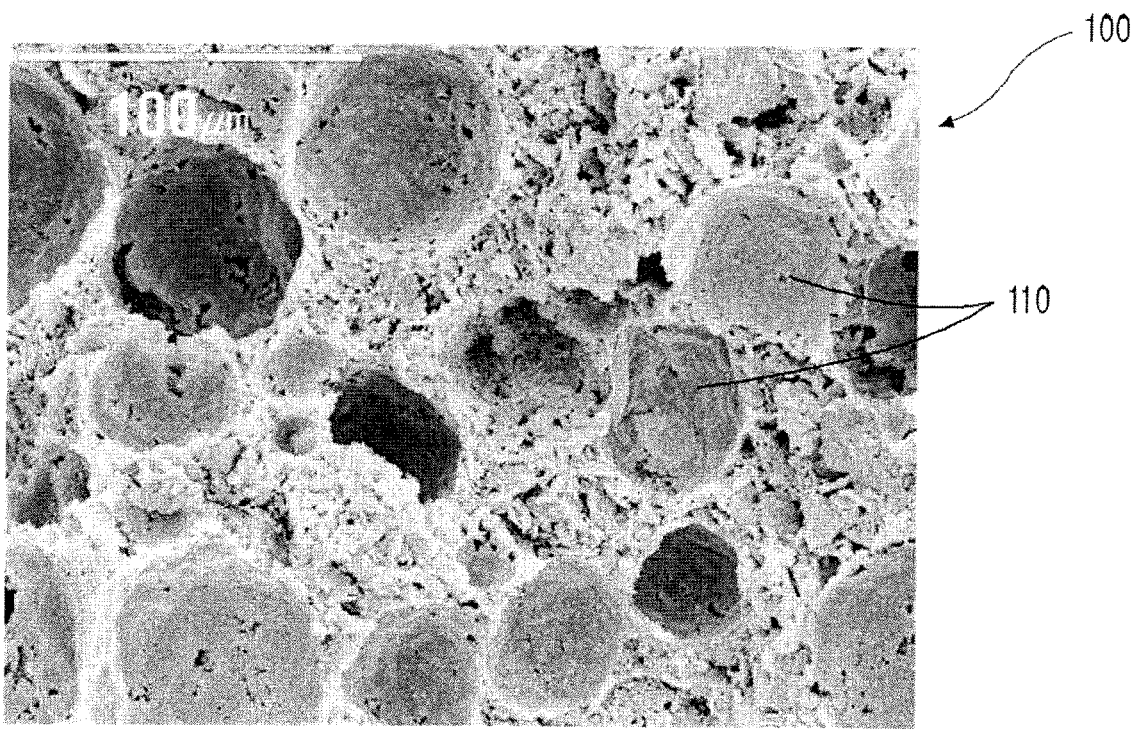
FIG. 3 is a high-magnification image showing a section of the porous humidity-control tile.

Referring to FIGS. 1 to 3, according to the current embodiment, the porous humidity-control tile 100 includes about 40% to about 95% by weight of diatomite, and one or more of ochre, red clay, kaolin, zeolite, illite, vermiculite, feldspar, pottery stone, and pyrophyllite.

Raw-material powder including the above-mentioned diatomite and the other component or components has a specific weight of about 2 g/cm$^3$ or higher.

Diatomite is a main component of the raw-material powder and includes amorphous silica and a small amount of crystalline silica. Since diatomite has a complex structure with primary and secondary surficial pores, the density of diatomite is very low and is used as a good filter aid, adsorbent, additive, carrier, or abrasive.

The porous humidity-control tile 100 includes a matrix structure 120 having nano pores 122, and numerous micro cellular spherical pores 110 are disposed throughout the matrix structure 120. That is, the porous humidity-control tile 100 has a double pore structure.

When the porous humidity-control tile 100 is in a slurry state before a firing process, a hollow pore forming material (not shown) is included in the porous humidity-control tile 100, and when the porous humidity-control tile 100 is fired, the cellular spherical pores 110 are formed as the pore forming material is removed. Thus, the size of the cellular spherical pores 110 corresponds to that of the pore forming material, and the cellular spherical pores 110 have a cellular shape.

That is, the cellular spherical pores 110 are formed after the pore forming material included in a half-finished product is removed by carbonization. The pore forming material is removed from the half-finished product in a state where the pore forming material is uniformly distributed in the half-finished product, so that the cellular spherical pores 110 can be formed in a tired structure inside the porous humidity-control tile 100.

In more detail, the pore forming material may include a hollow polymer. For example, the pore forming material may includes at least one of poly(methylmethacrylate-co-ethyleneglycol dimethacrylate) and polymethylmethacrylate-ethyleneglycol coploymer.

In the current embodiment, polymethylmethacrylate is used in the form of hollow microspheres having an inner diameter of about 5 μm to about 200 μm.

If the hollow microspheres used as the pore forming material have an inner space smaller than about 5 μm, more hollow microspheres should be used, and thus the manufacturing costs of the porous humidity-control tile 100 may increase. On the other hand, if the hollow microspheres used as the pore forming material have an inner space smaller than about 200 μm, the strength of the porous humidity-control tile 100 may decrease largely. Therefore, the hollow microspheres used as the pore forming material may have an inner diameter in the range from about 5 μm to about 200 μm.

When the porous humidity-control tile 100 is in a half-finished state after the pore forming material is removed from the porous humidity-control tile 100 through a heat treatment process, the density of the cellular spherical pores 110 of the porous humidity-control tile 100 may be $10^7$ pores/cm$^3$ or greater, and the volume of the cellular spherical pores 110 may be 10% to 80% of the total volume of the porous humidity-control tile 100.

Owing to the above-described volume percent of the cellular spherical pores 110, the surface area of the porous humidity-control tile 100 can be increased to facilitate adsorption and condensation of moisture to the matrix structure 120 in which the nano pores 122 are formed. Therefore, the porous humidity-control tile 100 can have moisture adsorbing ability.

As shown in FIGS. 2 and 3, in the current embodiment, the size of the cellular spherical pores 110 of the porous humidity-control tile 100 is about 80 μm or lower.

Figure 4:
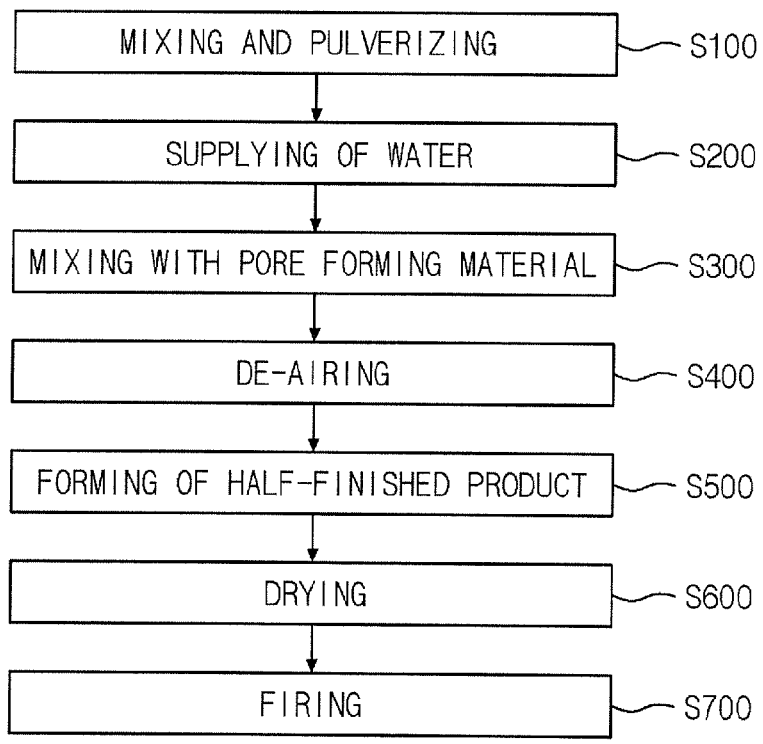
FIG. 4 is a flowchart for explaining a method for manufacturing a porous humidity-control tile according to an embodiment.

Hereinafter, an embodiment of a method for manufacturing a porous humidity-control tile will be explained with reference to FIG. 4. First, in operation S100, raw-material powder is mixed and pulverized.

At this time, the raw-material powder includes diatomite and one or more of ochre, red clay, kaolin, zeolite, illite, vermiculite, feldspar, pottery stone, and pyrophyllite.

In operation S200, moisture is supplied to the pulverized powder to form slurry. In operation S300, hollow microspheres (pore forming material) are mixed with the moisture-containing powder (slurry). In operation S400, air can be removed from the slurry mixed with the pore forming material in a vacuum state. In operation S500, a half-finished product can be obtained by shaping the slurry. In operation S600, the half-finished product can be dried to remove moisture. In operation 700, the dried half-finished product can be fired in a kiln.

In operation S100, the raw-material powder may be mixed and pulverized by wet ball milling. The finely pulverized powder can be wetted in a slurry state in operation S200, and the slurry can be mixed with the pore forming material in operation S300.

Therefore, the possibility of crashing of the pore forming material can be reduced because the pore forming material is not added to the raw-material powder in operation S100.

In operation S200, the amount of moisture contained in the slurry may be controlled by filter pressing.

After the moisture control, the slurry can be carried into a de-airing pug mill to remove air from the slurry.

Consecutively, operation S500 can be performed on the slurry to obtain a half-finished product.

That is, in operation S500, the de-aired slurry can be continuously extruded through a nozzle of the de-airing pug mill. Here, the slurry can be extruded in a tile scrap shape to obtain a half-finished porous humidity-control tile 100.

Thereafter, the half-finished product can be carried into a dry chamber and dried. In detail, since the half-finished product contains moisture, the dry chamber can be kept at a temperature of about 100° C. to about 200° C. to remove the moisture from the half-finished product (operation S600).

Alternatively, in operation S600, moisture may be removed from the half-finished product by placing the half-finished product for a long time in an indoor area at room temperature.

Then, in operation S700, the dried half-finished product is fired in the kiln to obtain a porous humidity-control tile 100.

At this time, the half-finished product may be kept in the kiln at a temperature of about 700° C. to about 900° C. for about 0.5 hours to about 6 hours.

Hereinafter, an explanation will be given on a method for manufacturing a porous humidity-control tile according to an embodiment. The humidity-control characteristics of the porous humidity-control tile manufactured according to an embodiment were evaluated as follows.

Prior to the measurement of the moisture adsorption and desorption amounts (representative humidity-control characteristics) of the porous humidity-control tile in a constant temperature and humidity chamber, the porous humidity-control tile was dried in an oven at about 110° C. for about 24 hours and then kept at about 25° C. with about 50% humidity for about 24 hours.

Then, the amount of adsorption of the porous humidity-control tile was measured by weighing the porous humidity-control tile after keeping the porous humidity-control tile in an approximately 25° C. and 90% humidity condition for about 24 hours, and the amount of desorption of the porous humidity-control tile was measured by weighing the porous humidity-control tile after keeping the porous humidity-control tile in an approximately 25° C. and 50% humidity condition for about 24 hours.

The average amount of adsorption/desorption were calculated from the amount of adsorption/desorption of specimens measured as described above by using the following equations.

Adsorption/desorption per unit area=[(amount of adsorption+amount of desorption)/2]/area of porous humidity-control tile [g/m$^2$] or Adsorption/desorption per unit weight=[(amount of adsorption+amount of desorption)/2]/weight of porous humidity-control tile [g/kg]

EXAMPLE 1

In Example 1, the characteristics of a porous humidity-control tile were evaluated according to the amount of hollow microspheres (pore forming material) and the thickness of specimens.

Raw-material powder containing a mixture of diatomite and clay (weight ratio of diatomite and clay=1:1) as shown in Table 1 below was pulverized and mixed through a ball milling process and was then made into slurry. The amount of moisture of the slurry was adjusted by filter pressing.

At this time, about 10 vol % to about 50 vol % of a pore forming material was added to the raw-material powder containing diatomite and clay. The raw-material slurry containing the pore forming material was carried into a de-airing pug mill for remove air from the slurry (de-airing).

While the de-airing process was performed, the slurry was shaped into a half-finished product. In detail, the slurry from which air was removed was continuously extruded through a nozzle of the de-airing pug mill in a tile scrap shape to obtain a half-finished product.

Thereafter, the half-finished product was dried in a dry chamber and was then fired at about 700° C. to about 900° C. for about 0.5 hours to about 6 hours.

Figure 5:
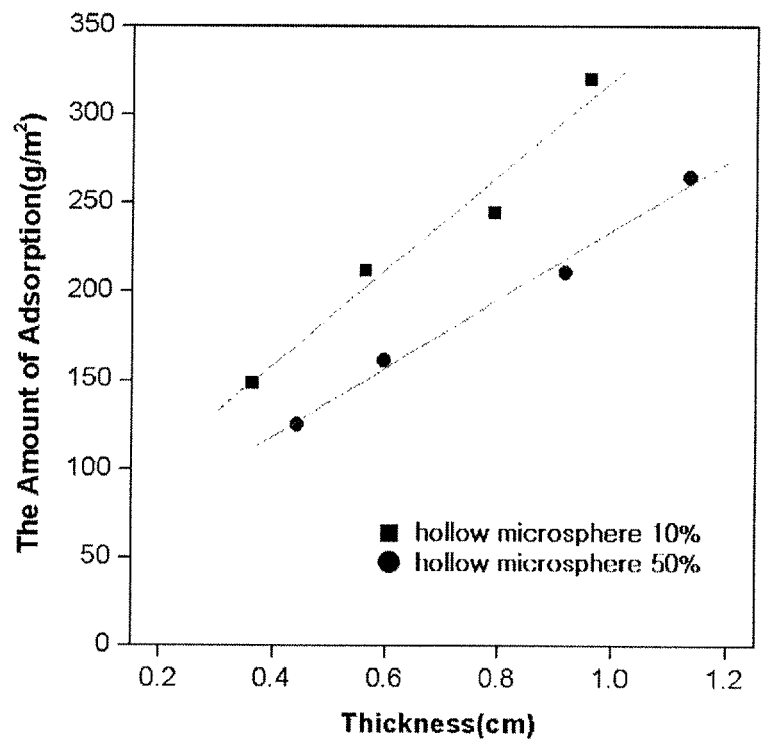
FIG. 5 is a graph showing the amount of adsorption per unit area of a porous humidity-control tile according to the amount of hollow microspheres used as a pore forming material when the porous humidity-control tile is manufactured and the thickness of the porous humidity-control tile.

The amounts of adsorption/desorption per unit area of specimens fabricated as described in Example 1 are proportional to the thickness of the specimens as shown in FIG. 5.

The amounts of adsorption/desorption per unit area of the specimens are reduced as the amount of hollow microspheres (pore forming material) increases.

Figure 6:
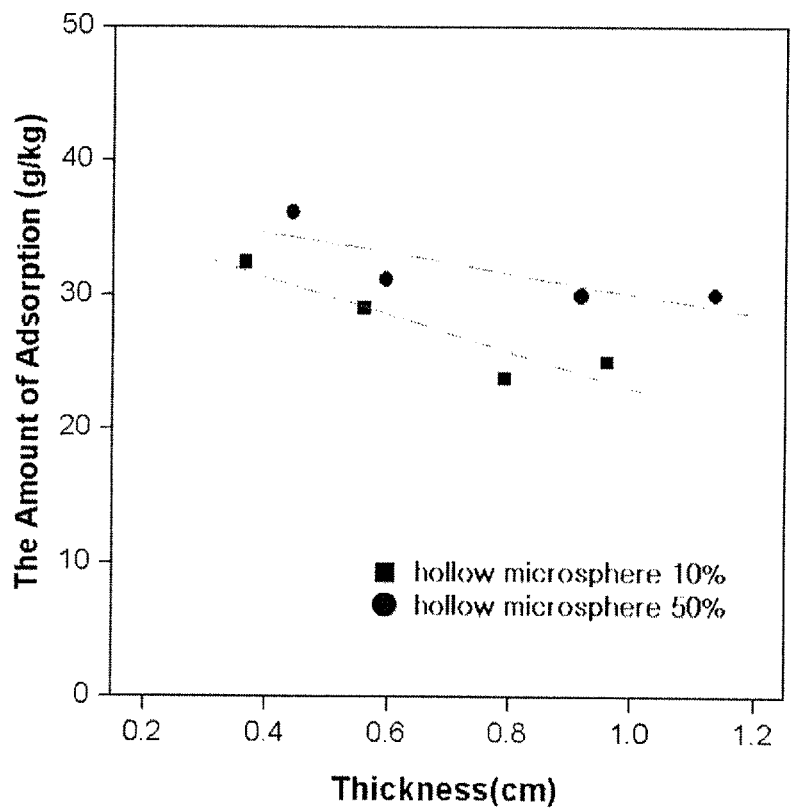
FIG. 6 is a graph showing the amount of adsorption per unit weight of the porous humidity-control tile according to the amount of hollow microspheres used as a pore forming material when the porous humidity-control tile is manufactured and the thickness of the porous humidity-control tile.

In FIG. 6, the amounts of adsorption/desorption per unit weight of the specimens are compared. When the amount of the hollow microspheres (pore forming material) are increased to 50 vol %, the amounts of adsorption/desorption of the specimens are also increased.

Figure 7:
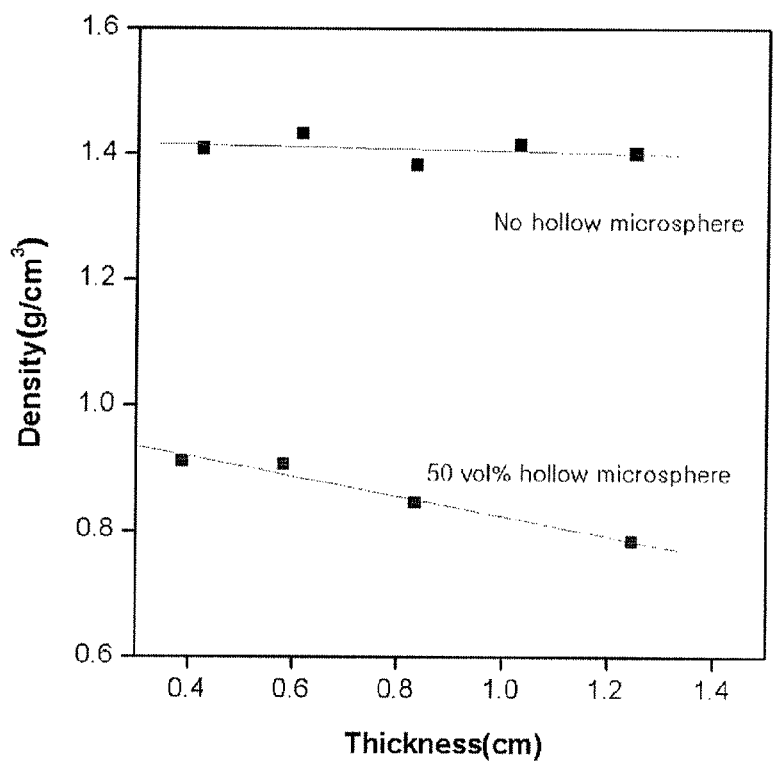
FIG. 7 is a graph showing the density of a porous humidity-control tile according to the use of a pore forming material and the thickness of the porous humidity-control tile.

That is, as the amount of the hollow microspheres (pore forming material) increases, the density of the specimens reduces to 1 g/cm$^3$ or lower as shown in FIG. 7. Therefore, the specimens can be lighter and more thermally insulative, and the humidity-control ability per unit weight of the specimens can be improved.

TABLE 1

| Specimen No. | Raw-material powder (wt %) | | Hollow microsphere (vol %) | Thickness (cm) | Density (g/cm$^3$) |
|---|---|---|---|---|---|
| | Diatomite | Clay | | | |
| 1 | 50 | 50 | 0 | 0.42 | 1.41 |
| 2 | 50 | 50 | 0 | 0.61 | 1.43 |
| 3 | 50 | 50 | 0 | 0.83 | 1.38 |
| 4 | 50 | 50 | 0 | 1.03 | 1.41 |
| 5 | 50 | 50 | 0 | 1.25 | 1.40 |
| 6 | 50 | 50 | 10 | 0.36 | 1.21 |
| 7 | 50 | 50 | 10 | 0.56 | 1.26 |
| 8 | 50 | 50 | 10 | 0.79 | 1.26 |
| 9 | 50 | 50 | 10 | 0.95 | 1.29 |
| 10 | 50 | 50 | 30 | 0.32 | 1.07 |
| 11 | 50 | 50 | 30 | 0.51 | 1.02 |
| 12 | 50 | 50 | 30 | 0.67 | 1.03 |
| 13 | 50 | 50 | 30 | 0.83 | 1.06 |
| 14 | 50 | 50 | 50 | 0.44 | 0.75 |

TABLE 1-continued

| Specimen | Raw-material powder (wt %) | | Hollow microsphere | Thickness | Density |
|---|---|---|---|---|---|
| No. | Diatomite | Clay | (vol %) | (cm) | (g/cm³) |
| 15 | 50 | 50 | 50 | 0.59 | 0.84 |
| 16 | 50 | 50 | 50 | 0.91 | 0.74 |
| 17 | 50 | 50 | 50 | 1.13 | 0.74 |

Heat treatment conditions: 800° C., 3 hr, in-air

EXAMPLE 2

In example 2, firing was performed for 3 hours while varying the firing temperature in the range from about 700° C. to about 1000° C. to observe the porous and humidity-control characteristics of a porous humidity-control tile.

As shown in Table 2, a mixture of red clay and kaolin was used as raw-material powder. The raw-material powder was pulverized and mixed through a ball milling process and was then made into slurry. The amount of moisture of the slurry might be adjusted by filter pressing.

At this time, about 50 vol % of hollow microspheres (pore forming material) were added to the raw-material powder. The raw-material slurry containing the pore forming material was carried into a de-airing pug mill for remove air from the slurry (de-airing).

While the de-airing process was performed, the slurry was shaped into a half-finished product. In detail, the slurry from which air was removed was continuously extruded through a nozzle of the de-airing pug mill. The slurry was extruded in a tile scrap shape to obtain a half-finished product. The half-finished product was dried in a dry chamber for removing moisture.

Figure 8:
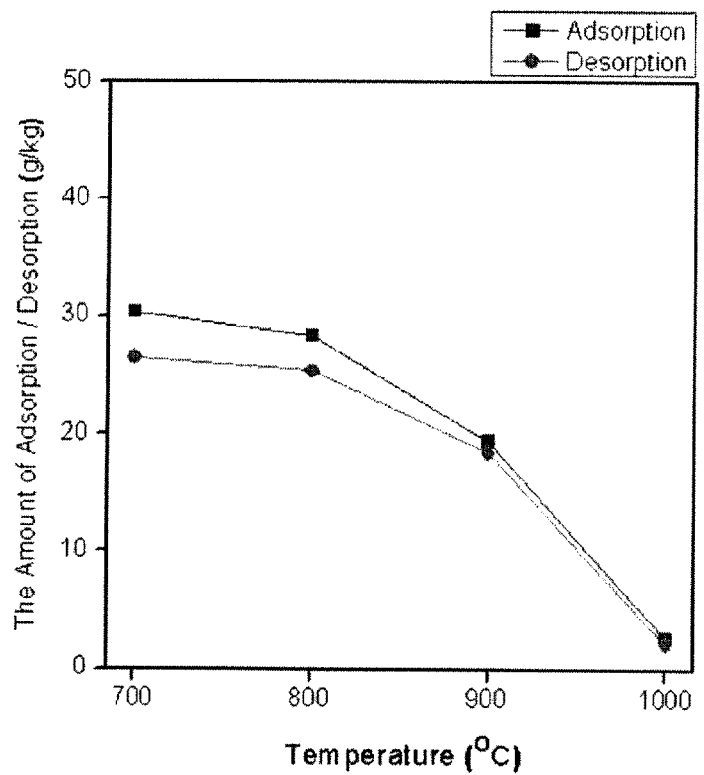
FIG. 8 is a graph showing the amount of adsorption/desorption per unit weight of a porous humidity-control tile according to the firing temperature of the porous humidity-control tile.

As shown in FIG. 8, as the heat treatment temperature increases, the amounts of adsorption/desorption per unit area of specimens decreases.

Particularly, when a specimen is heat-treated at a temperature higher than 900° C., the specimen has substantially no humidity-control ability due to destruction of nano pores at a high temperature. Therefore, to manufacture a humidity-control tile, heat treatment may be performed at a temperature of about 900° C. or lower.

TABLE 2

| Specimen | Raw-material powder (wt %) | | Pore forming material | Heat treatment conditions (temperature, time, | Density |
|---|---|---|---|---|---|
| No. | Red clay | Kaolin | (vol %) | atmosphere) | (g/cm³) |
| 18 | 40 | 60 | 50 | 700, 3 hr, air | 0.78 |
| 19 | 40 | 60 | 50 | 800, 3 hr, air | 0.81 |
| 20 | 40 | 60 | 50 | 900, 3 hr, air | 0.84 |
| 21 | 40 | 60 | 50 | 1000, 3 hr, air | 0.87 |

EXAMPLE 3

In example 3, the humidity-control characteristics of porous humidity-control tile specimens were measured while varying the amount of diatomite contained in raw-material powder in the range from about 40% to about 70%.

Raw-material powder was pulverized and mixed through a ball milling process and was then made into slurry. The amount of moisture of the slurry was adjusted by filter pressing.

Here, mixtures having diatomite: clay ratios as shown in Table 3 were used as the raw-material powder. About 10 vol % of hollow microspheres (pore forming material) were added to the raw-material powder. The raw-material slurry containing the pore forming material was carried into a de-airing pug mill for remove air from the slurry (de-airing).

The slurry from which air was removed was continuously extruded through a nozzle of the de-airing pug mill in a tile scrap shape to obtain a half-finished product.

The half-finished product was dried in a dry chamber for removing moisture.

In detail, the half-finished product was dried in the dry chamber at a temperature from about 100° C. to about 200° C. to remove moisture contained in the half-finished product.

The half-finished product was fired in a kiln at about 800° C. for about 3 hours to obtained a porous humidity-control tile.

Figure 9:
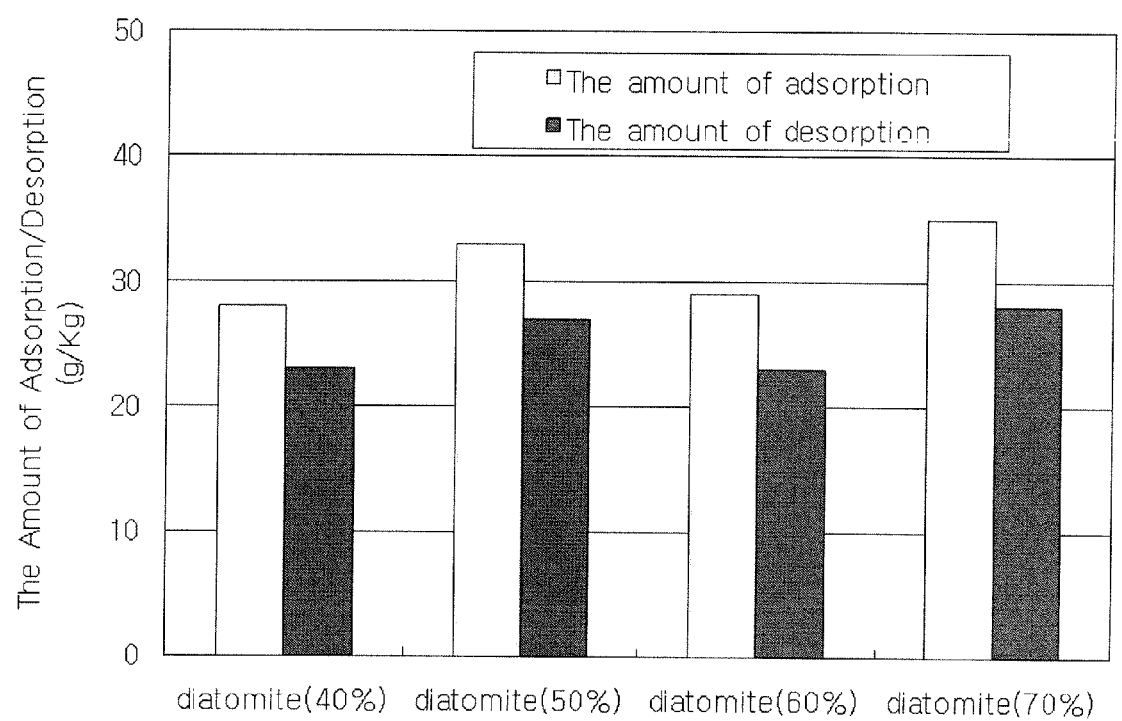
FIG. 9 is a graph showing the amount of adsorption/desorption per unit weight of a porous humidity-control tile according to the amount of diatomite of the porous humidity-control tile.

As shown in FIG. 9, the amounts of adsorption/desorption per unit area of the specimens are increased as the amount of diatomite of specimens increase.

TABLE 3

| Specimen | Raw-material powder (wt %) | | Hollow microsphere | Heat treatment conditions (temperature, time, |
|---|---|---|---|---|
| Example | Diatomite | Loess | (vol %) | atmosphere) |
| 22 | 40 | 60 | 10 | 800, 3hr, air |
| 23 | 50 | 50 | 10 | 800, 3hr, air |
| 24 | 60 | 40 | 10 | 800, 3hr, air |
| 25 | 70 | 30 | 10 | 800, 3hr, air |

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A porous humidity-control tile comprising a moisture controllable matrix structure having a double pore structure formed by nano pores and a plurality of cellular spherical pores, wherein the cellular spherical pores have a size corresponding to a size of hollow microspheres of a pore forming material that is removed by heat treatment, wherein each of the hollow microspheres has an inner diameter in a range of from about 5 μm to about 200 μm.

2. The porous humidity-control tile according to claim 1, wherein the matrix structure comprises:

about 40% to about 95% by weight of diatomite; and one or more of ochre, red clay, kaolin, zeolite, illite, vermiculite, feldspar, pottery stone, and pyrophyllite.

3. The porous humidity-control tile according to claim 2, wherein the pore forming material comprises at least one selected from the group consisting of polymethylmethacrylate, poly(methylmethacrylate-co-ethyleneglycol dimethacrylate), and polymethylmethacrylate-ethyleneglycol coploymer.

4. The porous humidity-control tile according to claim 3, wherein the spherical pores have a density of about $10^7$ pores/cm$^3$.

5. The porous humidity-control tile according to claim 1, wherein the matrix structure comprises about 10 vol % to about 80 vol % of the spherical pores.

6. The porous humidity-control tile according to claim 5, wherein the pore forming material is provided in the form of hollow spheres having an inner diameter of about 5 μm to about 200 μm.

7. The porous humidity-control tile according to claim 1, wherein the pore forming material comprises at least one selected from the group consisting of polymethylmethacrylate, poly(methylmethacrylate-co-ethyleneglycol dimethacrylate), and polymethylmethacrylate-ethyleneglycol coploymer.

8. The porous humidity-control tile according to claim 7, wherein the spherical pores have a density of about $10^7$ pores/cm$^3$.

9. The porous humidity-control tile according to claim 1, wherein the heat treatment is performed at about 700° C. to about 900° C. for about 0.5 hours to 6 hours.

10. The porous humidity-control tile according to claim 1, wherein the porous humidity-control tile has a rate of moisture adsorption/desorption per unit weight in a range from about 20 g/kg to about 60 g/kg and a rate of moisture adsorption/adsorption per unit area in a range from about 150 g/m$^2$ to about 450 g/m$^2$.

11. A method for manufacturing a porous humidity-control tile, the method comprising:
    mixing and pulverizing raw-material powder;
    supplying moisture to the pulverized powder to form a slurry;
    mixing the slurry with hollow microspheres used as a pore forming material, wherein each of the hollow microspheres has an inner diameter in a range of from about 5 μm to about 200 μm;,
    de-airing the slurry mixed with the pore forming material;
    shaping the de-aired slurry to obtain a half-finished product;
    drying the half-finished product; and
    firing the dried half-finished product in a kiln to obtain the porous humid-control tile, wherein the porous humidity-control tile comprises a moisture controllable matrix structure having a double pore structure formed by nano pores and a plurality of cellular spherical pores, wherein the cellular spherical pores have a size corresponding to a size of the hollow microspheres, and wherein the hollow microspheres are removed during the firing of the dried half-finished product in the kiln.

12. The method according to claim 11, wherein the raw-material comprises:
    about 40% to about 95% by weight of diatomite; and
    one or more of ochre, red clay, kaolin, zeolite, illite, vermiculite, feldspar, pottery stone, and pyrophyllite.

* * * * *